(12) United States Patent
Deniau (10) Patent No.: US 8,659,412 B2
(45) Date of Patent: Feb. 25, 2014

(54) TIRE PRESSURE MONITORING APPARATUS AND METHOD

(75) Inventor: Jean-Christophe Deniau, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 530 days.

(21) Appl. No.: 12/635,351

(22) Filed: Dec. 10, 2009

(65) Prior Publication Data

US 2011/0140876 A1    Jun. 16, 2011

(51) Int. Cl.
B60C 23/00    (2006.01)

(52) U.S. Cl.
USPC ........... 340/445; 340/442; 340/447; 340/448; 340/506; 340/5.31; 340/5.61; 340/10.4; 73/146.5; 73/146.8; 73/204.19

(58) Field of Classification Search
USPC ........ 340/445, 442, 447, 438, 448, 506, 5.31, 340/5.61, 10.4; 73/146.5, 146.8, 204.19, 73/104.23
See application file for complete search history.

(56) References Cited

U.S. PATENT DOCUMENTS

| | | |
|---|---|---|
| 4,703,359 A | 10/1987 | Rumbolt |
| 4,774,511 A | 9/1988 | Rumbolt et al. |
| 4,959,810 A | 9/1990 | Darbee et al. |
| 4,999,622 A | 3/1991 | Amano et al. |
| 5,061,917 A | 10/1991 | Higgs et al. |
| 5,201,067 A | 4/1993 | Grube et al. |
| 5,223,844 A | 6/1993 | Mansell et al. |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,414,761 A | 5/1995 | Darbee |
| 5,455,570 A | 10/1995 | Cook |
| 5,515,052 A | 5/1996 | Darbee |
| 5,537,463 A | 7/1996 | Escobosa et al. |
| 5,552,917 A | 9/1996 | Darbee et al. |
| 5,564,101 A | 10/1996 | Eisfeld et al. |
| 5,614,906 A | 3/1997 | Hayes et al. |
| 5,624,265 A | 4/1997 | Redford |
| 5,661,651 A | 8/1997 | Geschke et al. |
| 5,698,353 A | 12/1997 | Jeong |
| 5,731,763 A | 3/1998 | Herweck |

(Continued)

FOREIGN PATENT DOCUMENTS

| | | |
|---|---|---|
| DE | 4492128 | 6/1996 |
| DE | 19503756 A1 | 8/1996 |

(Continued)

OTHER PUBLICATIONS

Jeff Burgess, "Tire Pressure Monitoring System Reference Design", Tire Pressure Monitor System Demo, AN1951/D, Rev 1, May 2003, Motorola, Inc., 2003 (24 pgs.).

(Continued)

*Primary Examiner* — Tai T Nguyen (57) ABSTRACT

A tire pressure measuring device is configured with a plurality of communication protocols. Tire pressure information is sensed using the tire pressure measuring device. The tire pressure information is transmitted from the tire pressure measuring device to an external receiver device according to each of the plurality of communication protocols.

27 Claims, 4 Drawing Sheets

(56) References Cited

U.S. PATENT DOCUMENTS

| | | |
|---|---|---|
| 5,741,966 A | 4/1998 | Handfield et al. |
| 5,841,390 A | 11/1998 | Tsui |
| 5,900,808 A | 5/1999 | Lebo |
| 5,926,087 A | 7/1999 | Busch et al. |
| 5,959,751 A | 9/1999 | Darbee et al. |
| 6,002,450 A | 12/1999 | Darbee et al. |
| 6,005,486 A | 12/1999 | Fridley |
| 6,011,463 A | 1/2000 | Cormier, Sr. |
| 6,014,092 A | 1/2000 | Darbee et al. |
| 6,021,319 A | 2/2000 | Tigwell |
| 6,078,270 A | 6/2000 | Shim |
| 6,087,930 A | 7/2000 | Kulka et al. |
| 6,154,658 A | 11/2000 | Caci |
| 6,208,341 B1 | 3/2001 | van Ee et al. |
| 6,218,936 B1 * | 4/2001 | Imao ............... 340/447 |
| 6,271,748 B1 * | 8/2001 | Derbyshire et al. ........ 340/442 |
| 6,275,148 B1 | 8/2001 | Takamura et al. |
| 6,396,408 B2 | 5/2002 | Drummond et al. |
| 6,408,232 B1 | 6/2002 | Cannon et al. |
| 6,469,621 B1 | 10/2002 | Vredevogd et al. |
| 6,486,773 B1 | 11/2002 | Bailie et al. |
| 6,507,306 B1 | 1/2003 | Griesau |
| 6,567,032 B1 | 5/2003 | Mullaly |
| 6,612,165 B2 | 9/2003 | Juzswik et al. |
| 6,630,885 B2 | 10/2003 | Hardman et al. |
| 6,737,965 B2 | 5/2004 | Okubo |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,822,603 B1 | 11/2004 | Crimmins et al. |
| 6,832,573 B2 | 12/2004 | Evans et al. |
| 6,885,282 B2 | 4/2005 | Desai |
| 6,885,293 B2 | 4/2005 | Okumura |
| 6,915,146 B1 | 7/2005 | Nguyen et al. |
| 7,002,455 B2 | 2/2006 | Buck et al. |
| 7,095,316 B2 | 8/2006 | Kachouh et al. |
| 7,116,213 B2 | 10/2006 | Thiesen et al. |
| 7,120,430 B2 | 10/2006 | Christenson et al. |
| 7,161,476 B2 * | 1/2007 | Hardman et al. ........... 340/442 |
| 7,173,520 B2 | 2/2007 | Desai et al. |
| 7,224,269 B2 | 5/2007 | Miller et al. |
| 7,243,535 B2 | 7/2007 | Shimura |
| 7,453,350 B2 | 11/2008 | Kachouh et al. |
| 7,518,495 B2 * | 4/2009 | Tang et al. ............... 340/445 |
| 7,884,707 B2 * | 2/2011 | Wittliff et al. ............ 340/442 |
| 2001/0050611 A1 | 12/2001 | Achterholt |
| 2002/0030592 A1 | 3/2002 | Laitsaari et al. |
| 2002/0075145 A1 | 6/2002 | Hardman et al. |
| 2002/0186320 A1 | 12/2002 | Carlsgaard |
| 2003/0080861 A1 | 5/2003 | Okubo |
| 2003/0228879 A1 | 12/2003 | Witkowski |
| 2004/0041698 A1 | 3/2004 | Lin |
| 2004/0061601 A1 | 4/2004 | Freakes |
| 2004/0174246 A1 | 9/2004 | Mitchell |
| 2004/0203370 A1 | 10/2004 | Luo et al. |
| 2005/0104722 A1 | 5/2005 | Tang et al. |
| 2006/0217850 A1 | 9/2006 | Blaker et al. |
| 2007/0069947 A1 | 3/2007 | Banet et al. |
| 2007/0194898 A1 | 8/2007 | Fukumori |
| 2007/0247294 A1 | 10/2007 | Baader et al. |
| 2008/0024287 A1 | 1/2008 | Boyle et al. |
| 2008/0094198 A1 | 4/2008 | Yu |
| 2008/0100430 A1 | 5/2008 | Kochie et al. |
| 2008/0143593 A1 | 6/2008 | Graziano et al. |
| 2008/0173082 A1 | 7/2008 | Hettle et al. |
| 2008/0177441 A1 | 7/2008 | Marlett et al. |
| 2009/0033478 A1 | 2/2009 | Deniau et al. |
| 2009/0231114 A1 | 9/2009 | Yu |
| 2009/0267751 A1 | 10/2009 | Kaleal |
| 2011/0140876 A1 | 6/2011 | Deniau |

FOREIGN PATENT DOCUMENTS

| | | |
|---|---|---|
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| EP | 793579 | 9/1997 |
| EP | 1026016 | 8/2000 |
| EP | 1291230 | 3/2003 |
| EP | 1547827 | 6/2005 |
| EP | 1562162 | 8/2005 |
| GB | 2420415 | 5/2006 |
| JP | 62003537 | 1/1987 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2003025817 | 1/2003 |
| JP | 2004-145474 | 5/2004 |
| JP | 2006015832 | 1/2006 |
| JP | 2007200081 | 8/2007 |
| KR | 2003068216 | 8/2003 |
| RU | 2238190 | 10/2004 |
| WO | 9422693 | 10/1994 |
| WO | 0072463 | 11/2000 |
| WO | 0145967 | 6/2001 |
| WO | 03016079 | 2/2003 |
| WO | 03016079 A1 | 2/2003 |
| WO | 2004038674 | 5/2004 |
| WO | 2005085651 | 9/2005 |
| WO | 2005116603 | 12/2005 |
| WO | 2008107430 | 9/2008 |
| WO | 2009006518 A1 | 1/2009 |

OTHER PUBLICATIONS

"Motorola's MPXY8000 Series Tire Pressure Monitoring Sensors", Motorola Sensor Products Division Transportation & Standard Products Group, Motorola, Inc., May 2003 (22 pgs.).

Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs..).

"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

"Sony Remote Commander Operating Instructions RM-V701/V801", 1998, Sony Corporation.

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

Kais Mnif, "A Smart Tire Pressure Monitoring System", Sensors Magazine, Nov. 1, 2001.

\* cited by examiner

TIRE PRESSURE MONITORING APPARATUS AND METHOD

FIELD OF THE INVENTION

The field of the invention relates to tire pressure monitoring devices that utilize potentially different protocols.

BACKGROUND

The pressure and other operating parameters of tires are important concerns when operating a vehicle. Not only can incorrect tire pressure (or the incorrect setting of some other tire parameter) lead to inefficient vehicle operation (e.g., the waste of fuel and other problems leading to higher operating costs), but too low a tire pressure (or an inadequate value for some other tire parameter) can lead to safety problems such as accidents. It is difficult and sometimes time-consuming for users to manually measure tire pressure (or other parameters) with a pressure gauge (or other instruments). Consequently, automatic tire pressure monitoring systems have been devised and these systems free the user from manually making tire measurements.

An automatic tire pressure monitoring device typically mounts to a wheel within the tire and wirelessly transmits information indicative of conditions within the tire. The transmissions and the order of information are typically defined by a protocol corresponding to a receiver within the vehicle. Once the receiver receives the information, the information can be processed and presented to a user. For instance, a user can be warned when the pressure in their tires is too high or too low and thus avoid safety problems. Each automobile manufacturer typically has a unique, preferred, and pre-defined protocol to meet application specific needs and applications. Consequently, receivers using one protocol are not responsive to transmitters operating according to other protocols.

The use of different and unique protocols corresponding to unique tire pressure monitoring sensors, however, also complicates maintenance and service operations. For example, a special programming device is needed to configure the tire pressure monitor and a receiver must be specifically configured to receive the information. System upgrades are also more difficult to make since the programming device must use the correct protocol.

The programming of the tire pressure monitor may itself also be complicated and time consuming to perform since it is easy for a programmer to make mistakes. These problems lead to increased system costs and user frustrations with the system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where, in some examples and under some conditions, tire pressure information is communicated to a receiver in multiple formats and the receiver is programmed to recognize the information transmitted in one or more of these formats. Consequently, in these examples it is not necessary for a user to program or re-program their tire pressure measuring or monitoring device to transmit according to a specific format since the tire pressure measuring device automatically transmits information to the receiver in multiple formats at least one of which is recognizable by the receiver. This automatic transmission according to a variety of different protocols eliminates programming errors since subsequent programming (after initial programming) of the tire pressure measuring device is not required.

In other examples, a programming or activation device may be deployed where a user is required to pay for certain levels of service. In still other aspects, the tire pressure monitoring device can alternate between transmitting according to multiple protocols and transmitting using a single protocol, for instance, based upon the receipt (or non-receipt) of a trigger signal.

In many of these embodiments, a tire pressure measuring device is configured with a plurality of communication protocols. Tire pressure information is sensed using the tire pressure measuring device. The tire pressure information is transmitted from the tire pressure measuring device to an external receiver device according to each of the plurality of communication protocols.

In some aspects, the external receiver device is configured to operate according to a selected one of the plurality of communication protocols. At the external device, the tire pressure information transmitted according to each of the plurality of communication protocols is received. The tire pressure information is recognized according to the selected communication protocol (e.g., specifying the reception frequency to which the receiver is tuned) and not recognized according to the other communication protocols. Alternatively, the receiver may be configured to recognize the information according to more than one protocol.

In some of these embodiments, the tire pressure information is transmitted at predetermined intervals. For example, the tire pressure information may be transmitted once per minute. In other examples, the tire pressure information may be transmitted only upon the occurrence of some predetermined event (e.g., entering the garage of a user when the car is parked, or when the monitored pressure changes by more than some predetermined threshold). Other examples as to the timing of the transmission of the tire pressure information are possible.

The external device (e.g., the receiver) may include various elements such as a processor. The tire pressure information can include various types of information such as a measured pressure of a tire. Other examples of information may also be transmitted such as the temperature of the tire or the wear of the treads of the tires to mention two examples.

In many of these examples, each of the plurality of communication protocols specifies a particular communication approach, technique, or methodology. For example, a frequency of transmission and a format for transmission may be specified according to the protocol used. Other examples of transmission parameters may also be controlled or configured according to the protocols.

In other aspects, an apparatus includes a sensor and a transmitter. The sensor is configured to sense tire pressure information. The transmitter is coupled to the sensor and configured to transmit the tire pressure information from the sensor to an external receiver device according to each of a plurality of communication protocols.

Figure 1:
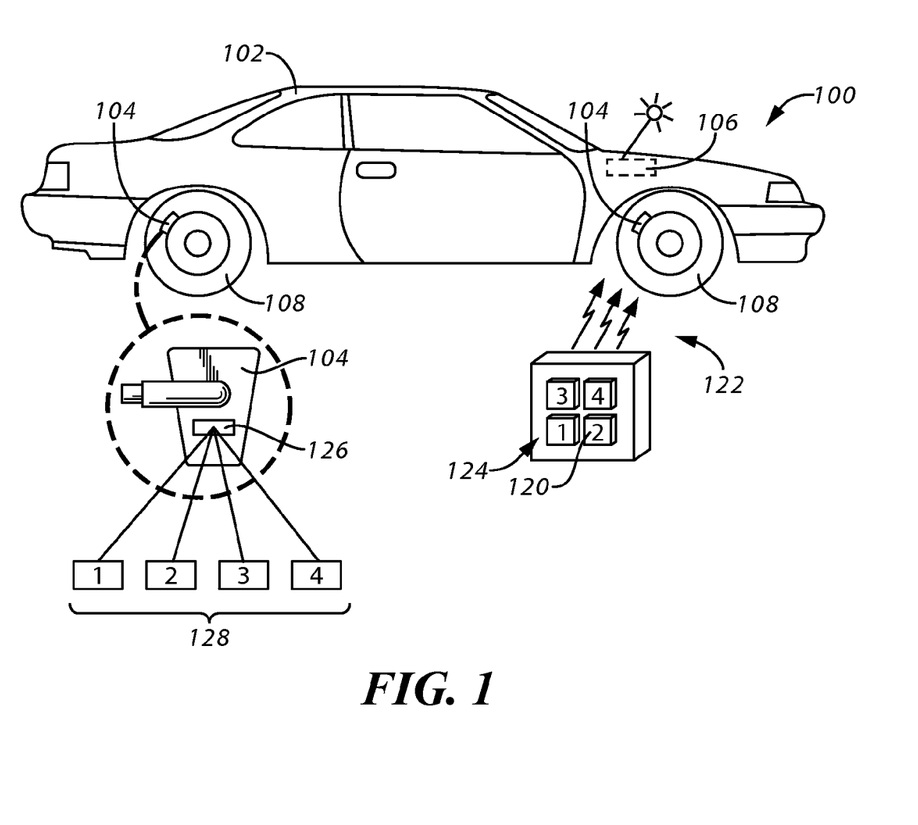
FIG. 1 comprises a block diagram of a tire pressure monitoring system according to various embodiments of the present invention.

Referring to FIG. 1, a tire pressure monitoring system 100 is shown assembled within a vehicle 102. The system 100 includes a receiver 106 that receives communications from tire pressure monitoring devices 104 assembled within each of the vehicle's tires 108. The receiver 106 may be any communication device configured to receive any type of transmitted communication but tuned to only recognize some of these communications. In one example, these communications are radio frequency (RF) communications, but other types of communications are also possible.

Although the device 104 is described as a tire pressure monitoring device herein, it will be appreciated that this device can gather and transmit other types of information related to the tire in addition to or in place of tire pressure information. For example, the information can include temperature information or information related to the wear of the treads of the tire. Appropriate sensors or sensing devices may be used to obtain this information. Other examples of information may also be gathered by the tire pressure monitoring device 104.

Each of the tire pressure monitoring devices 104 are assembled within the tires 108 of the vehicle 102 and, as mentioned, communicate information indicative of conditions within the tires 108 to the receiver 106. These conditions include temperature, pressure, and/or any other desired information that aids in the evaluation of tire conditions. Other examples of conditions may also be sensed.

The system 100 includes the tire pressure monitoring devices 104 that in this example all include a memory device 126. The memory device 126 is utilized for the storage of a plurality of communication protocols 128. The communication protocols 128 include individual and unique protocols that govern operation and communication between the tire pressure monitoring device 104 and the receiver 106. Two or more protocols may be used. Examples of communication protocols that may be used include protocols that specify the frequency and timing of transmissions from the tire pressure monitoring device 104 to the receiver 106 or the format of transmission (such as what constitutes a "1" or a "0," modulation type, error detection and/or correction content, synchronization pattern, and so forth to not but a few examples in these regards). Tire pressure monitoring information may be transmitted according to the protocols sequentially (e.g., using the same antenna) or at the same time (e.g., using different antennas).

Once the tire pressure monitoring device 104 is installed within the tire 108 and in one example, all of these communication protocols 128 are selected to govern operation and are used in communications to the receiver 106 when transmitting a given quanta of tire pressure information. Alternatively, a sub-set of two or more of the communication protocols 128 may be used. In other examples, the user may have to pay for the use of certain protocols or the usage of certain information (e.g., the user may have to pay an additional amount to receive temperature information as opposed to only pressure information).

The activation of the protocols 128 and the tire pressure monitoring device 104 may be accomplished by an activation device 120. The activation device 120 emits a wireless signal 122 that is received by a corresponding one of the tire pressure monitoring devices 104. Receipt of the wireless signal 122 causes the tire pressure measuring devices to be activated and to transmit the tire pressure information according to all the protocols stored in the tire pressure monitoring device. Alternatively, the activation device 120 may be used to select a subset of two or more protocols that may be used to transmit the tire pressure information to the receiver. In still another example, the use of the activation device 120 may be completely omitted (i.e., no activation is required) and the tire pressure monitoring devices may automatically transmit the tire pressure information to any receiver within range.

The programming device 120 includes a series of selectable buttons 124 (or other types of actuators) that are actuated by a user to indicate that they wish to activate the tire pressure monitoring device. Alternatively, the device 120 may be used to select groupings of two or more communication protocols for a particular tire pressure monitoring device to operate. Although the example device 120 is shown with buttons, other display and selection configurations, such as touch screens, switches or some other selection interface may be used as will be appreciated by those skilled in the art.

Accordingly, installation of the universal tire pressure monitoring devices 104 optionally includes the initial step of physically activating the tire pressure monitoring devices 104 within each of the corresponding tires 108 and/or selecting the two or more protocols in which to operate. The protocols 128 may be pre-installed or pre-programmed in each of the tire pressure monitoring devices 104 or may be downloaded as needed some time after manufacturing and/or installation of the devices 104 is completed. As used herein, the terms "pre-installed" or "pre-programmed" means configured to operate according to these protocols such as configured to operate at certain frequencies or transmit information in specified formats or according to certain frequencies.

If an activation device is used, the activation device 120 is placed proximate to each of the tire pressure monitoring devices 104 to send a signal 122. In one example, the signal 122 is a low frequency transmission received by the proximate tire pressure monitoring device 104.

In one example, the signal 122 triggers the tire pressure monitoring device to operate according to two or more of the stored communication protocols 128. For example, in this instance, if the operator selects button number one, the corresponding tire pressure monitoring device 104 will operate (i.e., transmit information) according to the stored communication protocols 128 indicated by the labels 1-4.

Other control operations besides the buttons 124 indicated in the illustrated example. Further, the activation device 120 may utilize other wireless communication protocols to communicate and trigger the selection of the desired communication protocol in which the corresponding tire pressure monitoring device 104 would operate.

Figure 2:
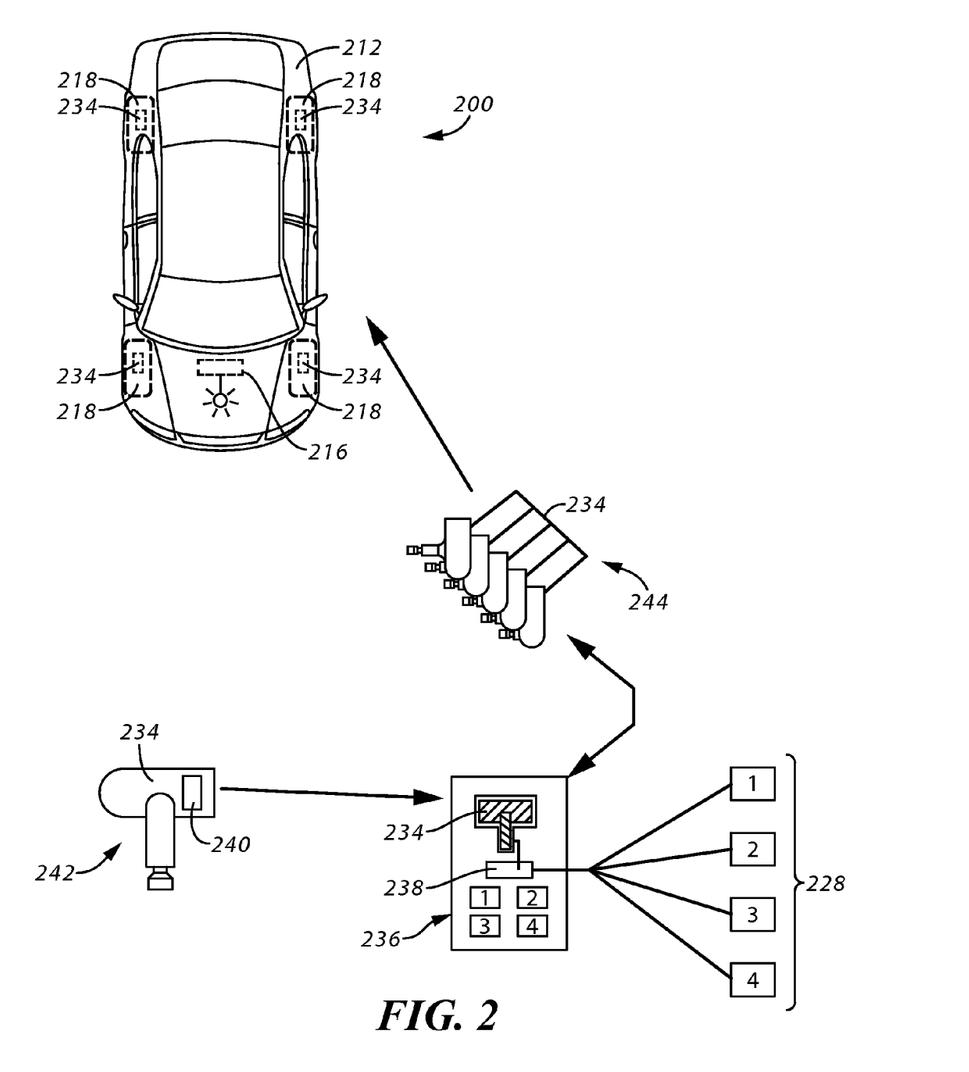
FIG. 2 comprises a block diagram of another example of a tire pressure monitoring system according to various embodiments of the present invention.

Referring to FIG. 2, another example tire pressure monitoring system 200 utilizes a tire pressure monitoring device 234 that includes a memory 240. The memory 240 of the tire pressure monitoring device 234 does not include any communication protocol data. Instead, the memory 240 is provided with a space for the communications protocols. Initially, the tire pressure monitoring device 234 with the memory 240 is blank as indicated by the element with label 242. The blank tire pressure monitoring device 242 is inserted within a programming device 236. The programming device 236 includes a memory device 238 that stores the plurality of communication protocols 228. The tire pressure monitoring device 234 is placed into electrical communication by way of an interface with the programmer 236. The programmer 236 is then actuated to download or flash program a plurality of communication protocols 228 from the memory device 238 into the memory device 240 of the tire pressure monitoring device 234. This step may be accomplished prior to installation into the vehicle 212 at the time of manufacture. In some examples, the user may have to pay or have to pay extra to use certain protocols.

Accordingly, in some examples each tire pressure monitoring device 234 that is to be assembled into a vehicle is first flash programmed using the programming device 236 to install and select a plurality of desired communication protocols 228. Programmed tire pressure monitoring devices 234 are indicated as being programmed by reference numeral 244 and can then be installed within the vehicle 212 to operate with the specific vehicle receiver 216.

During one example of an installation process of the example system illustrated in FIG. 2, a plurality of blank tire pressure monitoring devices 234 are available for flash programming. The non-programmed tire pressure monitoring devices are indicated at 242. Prior to installation within the vehicle 212, each tire 218 pressure monitoring device 234 is loaded with a program by the programming device 236. The interface between the programming device 236 and the tire pressure monitoring device 234 is a physical connection. However, wireless connections could also be utilized for loading the desired communication protocol into the tire pressure monitoring device 234. The programmed tire pressure monitoring devices indicated by the label 244 can then be installed within the vehicle 212.

Figure 3:
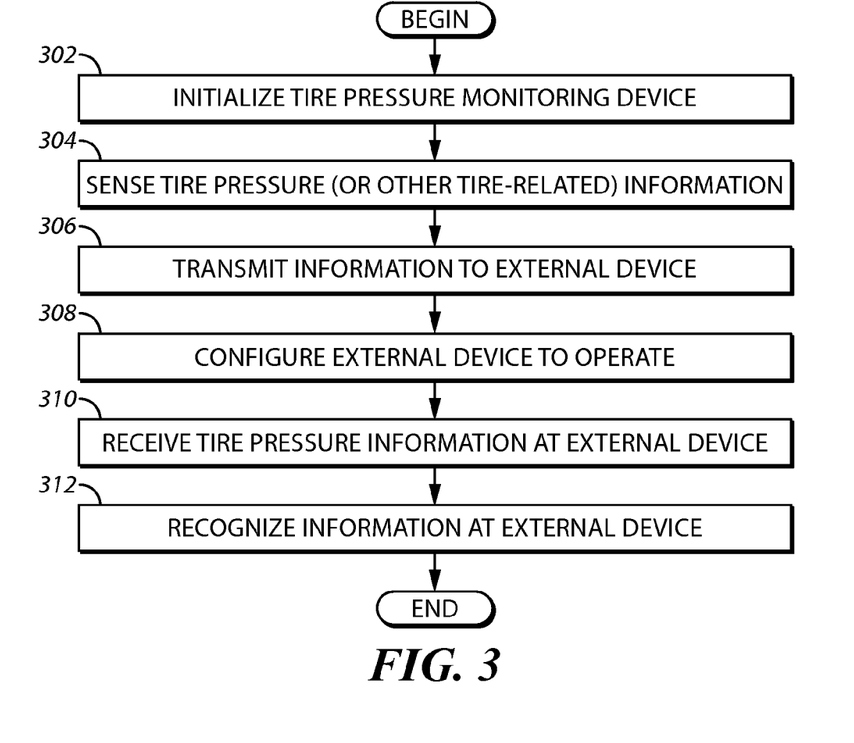
FIG. 3 comprises a flowchart showing one example of an approach for monitoring pressure and/or other parameters of a tire according to various embodiments of the present invention.

Referring now to FIG. 3, one example of an approach for monitoring the pressure or other parameters of a tire is described. At step 302, a tire pressure measuring device may be configured or programmed with one or more communication protocols. For example, protocols may be used that specify the frequency or timing of operation of a transmitter that transmits the tire pressure information. Other examples of parameters can be adjusted or set by the protocols. In addition, these protocols may conform to government or industry standards or requirements (e.g., utilizing a specific band of operating frequencies in one example).

The tire pressure monitoring device may be configured with a protocol programming or activation device at the time of manufacture or may be programmed at a time later than the time of manufacture. Alternatively, in some examples, the protocols used may be changed after manufacturing. In this respect, a user may pay for the activation of certain protocols and/or to receive certain types of information from the monitoring device. Based upon the payment amount, the type of information (e.g., pressure, temperature, and so forth) that is actually transmitted and/or the protocols activated may be varied. In one example of this approach, the higher the payment, the greater the amount of information transmitted. In still another example of this approach, the higher the amount of payment, the greater the number of protocols activated.

At step 304, tire pressure information is sensed using the tire pressure measuring device. The tire pressure information may include pressure information, tread wear information, and temperature information to name a few examples.

At step 306, the tire pressure information is transmitted from the tire pressure measuring device to an external device according to each of the one or more communication protocols. The transmission may be over a wireless link. However, the transmission may be over a wired, optical, or any other type of link. Other examples of links may also be used to transmit the information. Tire pressure monitoring information may be transmitted according to these protocols sequentially (e.g., using the same antenna (or other physical link), one at a time) or at the same time (e.g., simultaneously, using different antennas (or different physical links, as the case may be)).

At step 308, the external receiver device is configured to operate (i.e., receive or monitor transmitted information) according to a selected one of the plurality of communication protocols. Alternatively, the receiver device may be configured to recognize information according to more than one protocol.

At step 310, at the external device, the tire pressure information transmitted is received according to each of the plurality of communication protocols. Alternatively, the information may be transmitted using a subset of the available protocols, for example, two or more protocols.

At step 312, at the external device the tire pressure information transmitted according to one or more of the communication protocols is recognized and the tire pressure information transmitted according to others of the plurality of communication protocols is not recognized. In other words, the receiver will ignore information transmitted according to protocols for which it is not been configured to receive or recognize. Alternatively, the receiver may also recognize two or more protocols.

Figure 4:
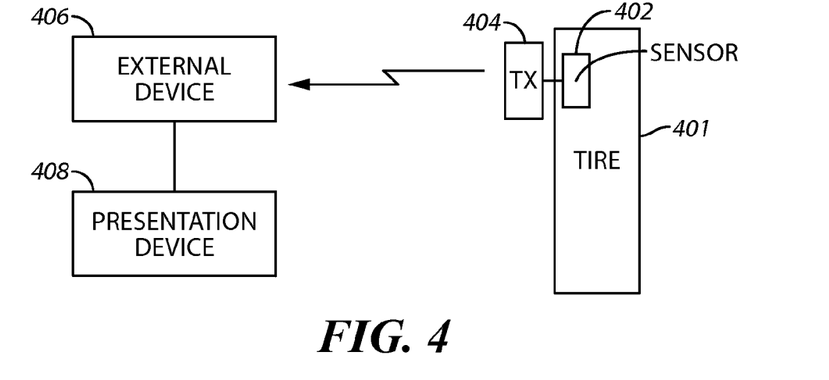
FIG. 4 comprises a block diagram of another example of a tire pressure monitoring system according to various embodiments of the present invention.

Referring now to FIG. 4, another example of a system 400 for monitoring tire pressure of a tire 401 includes a sensor 402, a transmitter 404, and an external device 406. Although only one tire/sensor/transmitter combination is shown in FIG. 4, it will be understood that these elements can be located at some or all of the other tires that are present at a vehicle.

The sensor 402 is any type of sensor capable of measuring any type of parameter related to tire operation such as pressure or temperature. The sensor 402 is configured to obtain tire pressure information of a tire and communicate this information to the transmitter 404. The sensor 402 and/or the transmitter 404 may include a processor and memory. The memory may include programmed instructions that are used to execute the approaches described herein.

The transmitter 404 is any type of transmitting communication device and is, in one example, a radio frequency (RF) transmitter. The transmitter 404 communicates the information from the sensor 402 via a communication link 405. In this case, the communication link is an RF link. However, it will be appreciated that the communication link 405 may be a hard-wired link, or an optical link, to name a few examples.

The external device 406 (e.g., a receiver) is communicatively coupled to the transmitter 404 via the communication link 405. In one example, the external device is an RF receiver. The transmitter 404 is configured to transmit the tire pressure information to the external device 406 at an output of the transmitter 404 according to each of the one or more communication protocols that are stored in the transmitter 404.

The external device 406 is configured to receive the tire pressure information transmitted from the transmitter 404 according to each of the communication protocols but recognize information transmitted according to only some of these protocols. The external device 406 is configured to recognize the tire pressure information transmitted according to one or more selected communication protocols (e.g., communication protocols it is configured or programmed to recognize) and to not recognize the tire pressure information transmitted according to the others of communication protocols (e.g., communication protocols it has not been configured or programmed to recognize). In this regard, the external device 406 may include a processor and memory. The memory may include programmed instructions that are used to execute the approaches described herein.

The external device 406, after receiving the information from the transmitter 404, may analyze the information for presentation to a user. In this respect and to take one example, the external device 406 may compare the tire pressure information received to a predetermined tire pressure threshold. If the comparison indicates that the pressure is too low, the external device 406 may determine that a warning must be issued to a user. It will be appreciated that the external device 406 may be configured to analyze other information and present the results of this analysis to the user such as in the form of reports or summaries of the condition of one or more tires over time. The external device 406 may also analyze the sensed information to predict future tire performance and possible emergencies based upon the received information. These predictions may also be presented to the user.

The external device 406 is coupled to a presentation device 408. The presentation device 410 is configured to present information from the external device 406 relating to the tire pressure to a user. In one example, the presentation device is a warning display that warns the user that the pressure in the tire 401 is too low.

The presentation device 408 may be any type of device that is capable or can be configured to present information related to the condition of a tire to a user. In this respect, the presentation device 408 may use any type of visual indicator (e.g., video or visual screens, light emitting diodes (LEDs) or the like) and/or audio indicator (e.g., audio speakers or other warning indicators).

It will also be appreciated that the presentation device 408 may be positioned at any suitable location such as within a car or within a building (e.g., the home of a user). Further, it will be appreciated that the presentation device 408 and/or the external device 406 may be coupled to other devices, systems, or networks. For example, either or both of these devices may be coupled to a satellite system or the Internet to mention two examples.

Figure 5:
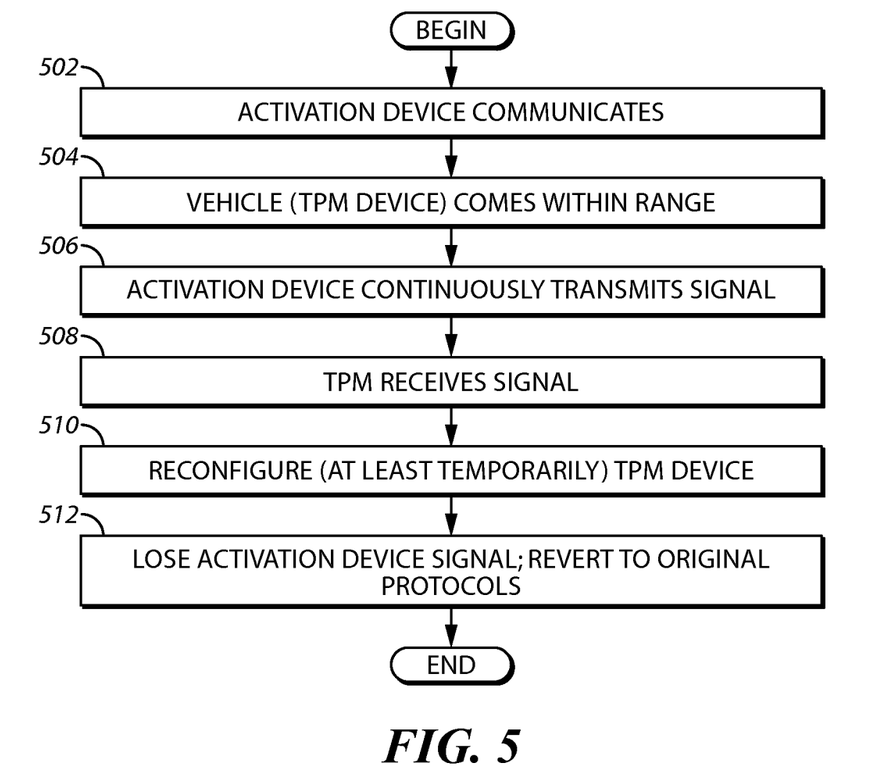
FIG. 5 comprises a flowchart of an approach of operating a tire pressure monitoring device according to various embodiments of the present invention.

Referring now to FIG. 5, another example of an approach for operating a tire pressure monitoring device is described. At step 502, an activation device (e.g., a transponder) in the vehicle or at some location in close proximity (e.g., within a few feet) of the vehicle communicates to one or more of the tire pressure monitoring devices located at or near one or more wheels of the vehicle. In some examples, the tire pressure monitoring device transmits its monitored information according to all protocols for which it is configured.

Then, at step 504 the vehicle comes into range of the activation device. At step 506, the activation device continuously transmits a signal (e.g., a trigger signal) that includes information that is used to select one or more protocols used by the tire pressure monitoring device in making transmissions. All other protocols currently used by the device are to be at least temporarily deactivated and suspended. In this respect and to take one example, ten protocols are initially being used and then the trigger signals re-configures the tire pressure measuring device to transmit according to a single protocol from the original ten protocols with the remaining nine protocols being temporarily suspended.

At step 508, a receiver at the tire pressure monitoring device receives the trigger signal from the activation device. After receiving the trigger signal, at step 510 the tire pressure monitoring device recognizes the information in the signal (that identifies the protocol or protocols to use) and then transmits according to the protocol(s) identified by the signal. For example, the signal from the activation device may request the tire pressure monitoring device to transmit according to one or more protocols unique to a particular manufacturer.

At step 512, once the signal from the activation device is lost or no longer being received, the tire pressure monitoring device may revert to transmitting according to all of the protocols again. For example, the tire pressure monitoring device may scan for signals from an activation device and when the scan no longer detects the activation device or signals transmitted by an activation device, then the tire pressure monitoring device can revert to transmitting according to all protocols once again (or to a sub-set of all available protocols). In this way, the tire pressure monitoring device can transmit according to all protocols, then transmit according to one (or more) of the entire set of protocols, and then return to transmit according to all protocols.

It should be understood that any of the devices described herein (e.g., the programming or activation devices, the tire pressure monitoring devices, the receivers, the transmitters, the sensors, the presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or non-volatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

Thus, approaches are provided where tire pressure information is communicated from a tire pressure measurement or monitoring device to a receiver in multiple formats and the receiver is programmed to recognize the information transmitted in one or more of these formats. Consequently, in these examples it is not necessary for a user to program or re-program their tire pressure measuring or monitoring device to transmit according to a specific format since the tire pressure measuring device automatically transmits information to the receiver in multiple formats at least one of which is recognizable by the receiver. This automatic transmission according to a variety of different protocols eliminates programming errors since subsequent programming (after initial programming) of the tire pressure measuring device is not required.

In other examples, a programming or activation device may be used to at least temporarily select certain protocols from the larger set normally used by the tire pressure measurement device. The approaches described herein are easy to use and result in cost savings for users.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention. As but one example in these regards, the tire pressure sensor could be configured to stagger its use of a plurality of protocols such that each is used in sequence for consecutive update transmissions. To illustrate, a first protocol and a second protocol could be used in a cyclical fashion, with each transmission conveying a current pressure reading. Even though the receiver would miss every other reading, this would likely not comprise a significant issue in many application settings (presuming that the transmission duty cycle is short).

What is claimed is:

1. A method of operating a tire pressure monitoring system comprising:
   configuring a tire pressure measuring device with a plurality of separate programs that each transmit according to only one of a plurality of communication protocols;
   sensing tire pressure information using the tire pressure measuring device;
   wherein the plurality of separate programs are not changed after an initial installation;
   receiving a trigger signal from a control unit;
   upon receiving the trigger signal, transmitting the tire pressure information from the tire pressure measuring device to an external receiver device using a first subset of the plurality of separate programs during a first time period, the first subset being a plurality of programs;
   subsequently transmitting the tire pressure information from the tire pressure measuring device to the external receiver device using a second subset of the plurality of separate programs during a second time period, the second subset being a plurality of programs.

2. The method of claim 1 further comprising:
   configuring the external receiver device to operate according to a selected one of the plurality of communication protocols;
   at the external receiver device:
   receiving the tire pressure information;
   recognizing the tire pressure information transmitted according to the selected one of the plurality of communication protocols and not recognizing the tire pressure information transmitted according to others of the plurality of communication protocols.

3. The method of claim 1 wherein the tire pressure information is transmitted at predetermined intervals.

4. The method of claim 1 wherein the external receiver device comprises a processor.

5. The method of claim 1 wherein the tire pressure information comprises a measured pressure of a tire.

6. The method of claim 1 wherein each of the plurality of communication protocols specifies a communication approach selected from a group consisting of: a frequency of transmission and a format for transmission.

7. A system for monitoring tire pressure comprising:
   a sensor, the sensor configured to obtain tire pressure information of a tire;
   an internal receiver;
   a transmitter coupled to the receiver and having an output and coupled to the sensor;
   an external receiver device communicatively coupled to the transmitter;
   wherein the transmitter is configured to transmit the tire pressure information to the external receiver device at the output of the transmitter using selected ones of a plurality of separate programs, each separate program transmitting according to only one of a plurality of communication protocols; and
   wherein the external receiver device is configured to recognize the tire pressure information transmitted according to a selected one of the plurality of communication protocols and to not recognize the tire pressure information transmitted according to others of the plurality of communication protocols;
   wherein the plurality of separate programs are not changed after an initial installation;
   wherein the internal receiver is configured to receive a trigger signal from a control unit and the transmitter is configured to transmit the tire pressure information from the tire pressure measuring device to the external receiver device using a first subset of the plurality of separate programs during a first time period the first subset being a plurality of programs, and to subsequently transmit the tire pressure information from the tire pressure measuring device to the external receiver device using a second subset of the plurality of separate programs during a second time period, the second subset being a plurality of programs.

8. The system of claim 7 wherein the transmitter is configured to transmit the information at pre-selected intervals.

9. The system of claim 7 wherein the external receiver device comprises a processor.

10. The system of claim 7 wherein the tire pressure information comprises a measured pressure of the tire.

11. The system of claim 7 wherein each of the plurality of communication protocols specifies a communication approach selected from a group consisting of: a frequency of transmission and a format for transmission.

12. The method of claim 11 wherein the communication approach is the format for transmission.

13. An apparatus for monitoring tire pressure comprising:
   a sensor, the sensor configured to obtain tire pressure information of a tire;
   a transmitter having an output and coupled to the sensor, the transmitter being configured to transmit the tire pressure information to an external receiver device at the output of the transmitter using selected ones of a plurality of separate programs, each separate program transmitting according to only one of a plurality of communication protocols;

wherein the plurality of separate programs are not changed after an initial installation;

wherein a receiver is coupled to the transmitter and is configured to receive a trigger signal, from a control unit and the transmitter is configured to transmit the tire pressure information to the external receiver device using a first subset of the plurality of separate programs during a first time period, the first subset being a plurality of programs, and to subsequently transmit the tire pressure information from the tire pressure measuring device to the external receiver device using a second subset of the plurality of separate programs during a second time period, the second subset being a plurality of programs.

14. The apparatus of claim 13 wherein the transmitter is configured to transmit the information at pre-selected intervals.

15. The apparatus of claim 13 wherein the tire pressure information comprises a measured pressure of the tire.

16. The apparatus of claim 13 wherein each of the plurality of communication protocols specifies a communication approach selected from a group consisting of: a frequency of transmission and a format for transmission.

17. An apparatus comprising:
a receiver;
a sensor configured to sense tire pressure information; and
a transmitter coupled to the sensor and the receiver, and configured to transmit the tire pressure information from the sensor to an external receiver device using selected ones of a plurality of separate programs, each separate program transmitting according to only one of a plurality of communication protocols;

wherein the plurality of separate programs are not changed after an initial installation;

wherein the receiver is coupled to the transmitter and is configured to receive a trigger signal from a control unit, and the transmitter is configured to transmit the tire pressure information to the external receiver device using a first subset of the plurality of separate programs during a first time period, the first subset being a plurality of programs, and to subsequently transmit the tire pressure information from the tire pressure measuring device to the external receiver device using a second subset of the plurality of separate programs during a second time period, the second subset being a plurality of programs.

18. The apparatus of claim 17 wherein the tire pressure information is transmitted at predetermined intervals.

19. The apparatus of claim 17 wherein the tire pressure information comprises a measured pressure of a tire.

20. The apparatus of claim 17 wherein each of the plurality of communication protocols specifies a communication approach selected from a group consisting of: a frequency of transmission and a format for transmission.

21. A non-transitory computer readable medium comprising computer executable instructions adapted to perform a method, the method comprising:

sensing tire pressure information at the tire pressure measuring device;

transmitting the tire pressure information from the tire pressure measuring device to an external receiver device using selected ones of a plurality of separate programs each separate program transmitting according to only one of the plurality of communication protocols;

wherein the plurality of separate programs are not changed after an initial installation receiving a trigger signal;

upon receiving the trigger signal from a control unit, transmitting the tire pressure information from the tire pressure measuring device to the external receiver device using a first subset of the plurality of separate programs during a first time period, the first subset being a plurality of programs;

subsequently transmitting the tire pressure information from the tire pressure measuring device to the external receiver device using a second subset of the plurality of separate programs during a second time period, the second subset being a plurality of programs.

22. A method of operating a tire pressure monitoring system comprising:

configuring a tire pressure measuring device with a plurality of separate programs that each transmit according to only one of a plurality of communication protocols;

sensing tire pressure information using the tire pressure measuring device;

receiving a trigger signal from a control unit;

upon receiving the trigger signal, transmitting the tire pressure information from the tire pressure measuring device to the external receiver device using a first subset of the plurality of separate programs during a first time period, the first subset being a plurality of programs;

subsequently transmitting the tire pressure information from the tire pressure measuring device to the external receiver device using a second subset of the plurality of separate programs during a second time period, the second subset being a plurality of programs.

23. The method of claim 22 further comprising:
configuring the external receiver device to operate according to a selected one of the plurality of communication protocols;
at the external receiver device:
receiving the tire pressure information;
recognizing the tire pressure information transmitted according to the selected one of the plurality of communication protocols and not recognizing the tire pressure information transmitted according to others of the plurality of communication protocols.

24. The method of claim 22 wherein the tire pressure information is transmitted at predetermined intervals.

25. The method of claim 22 wherein the external receiver device comprises a processor.

26. The method of claim 22 wherein the tire pressure information comprises a measured pressure of a tire.

27. The method of claim 22 wherein each of the plurality of communication protocols specifies a communication approach selected from a group consisting of: a frequency of transmission and a format for transmission.

* * * * *